United States Patent [19]

Hait

[11] 4,354,636
[45] Oct. 19, 1982

[54] TORQUE DRIVEN ROTARY IRRIGATION SYSTEM

[76] Inventor: James M. Hait, 8047 Chardonay Ct., San Jose, Calif. 95135

[21] Appl. No.: 149,813

[22] Filed: May 14, 1980

[51] Int. Cl.³ .............................................. B05B 3/04
[52] U.S. Cl. .................................. 239/177; 239/191; 239/710; 239/719
[58] Field of Search ........ 239/177, 191, 192, 710–716, 239/719, 721

[56] References Cited

U.S. PATENT DOCUMENTS

| | | | |
|---|---|---|---|
| 1,085,609 | 2/1914 | Heath | 239/721 |
| 3,202,172 | 8/1965 | Bergeron et al. | 239/716 |
| 3,536,261 | 10/1970 | Van Den Brink | 239/177 |
| 3,538,941 | 11/1970 | Bates | 239/715 |
| 3,590,853 | 7/1971 | Haynes . | |
| 3,606,160 | 9/1971 | Bonds et al. | 239/177 |
| 3,730,211 | 5/1973 | De Laine et al. . | |
| 3,980,098 | 9/1976 | Courtright | 239/716 |
| 4,151,858 | 5/1979 | Courtright | 239/711 |
| 4,260,109 | 4/1981 | Courtright | 239/720 |

FOREIGN PATENT DOCUMENTS

| | | | |
|---|---|---|---|
| 217436 | 5/1958 | Australia | 239/177 |
| 1093385 | 11/1967 | United Kingdom | 239/721 |

Primary Examiner—Bruce H. Stoner, Jr.
Assistant Examiner—Michael J. Forman

[57] ABSTRACT

A rotary irrigation system comprises a continuous length of irrigation pipe (10) having sprinkler heads (16) spaced along the length thereof, which pipe is connected at one end to a fixed upstanding water supply pipe and at the other end to a water reservoir (24). The water reservoir (24) is suspended on a lever arm (22) which is perpendicular to the irrigation pipe (10), said water reservoir being elevated from the ground when empty. The irrigation pipe (10) is supported at uniformly spaced intervals along its length by a plurality of wheels (20), said wheels having hubs (55) which receive said pipe and allow said pipe to rotate in one direction only. As the reservoir (24) gradually fills with water, said reservoir lowers to the ground and a torque is imparted to the irrigation pipe (10), said pipe being free to rotate in this direction. After the reservoir (24) reaches the ground, the water is released and the irrigation pipe (10) unwinds in the opposite direction. The unwinding acts to turn the wheels (20) and advance the pipe (10).

8 Claims, 7 Drawing Figures

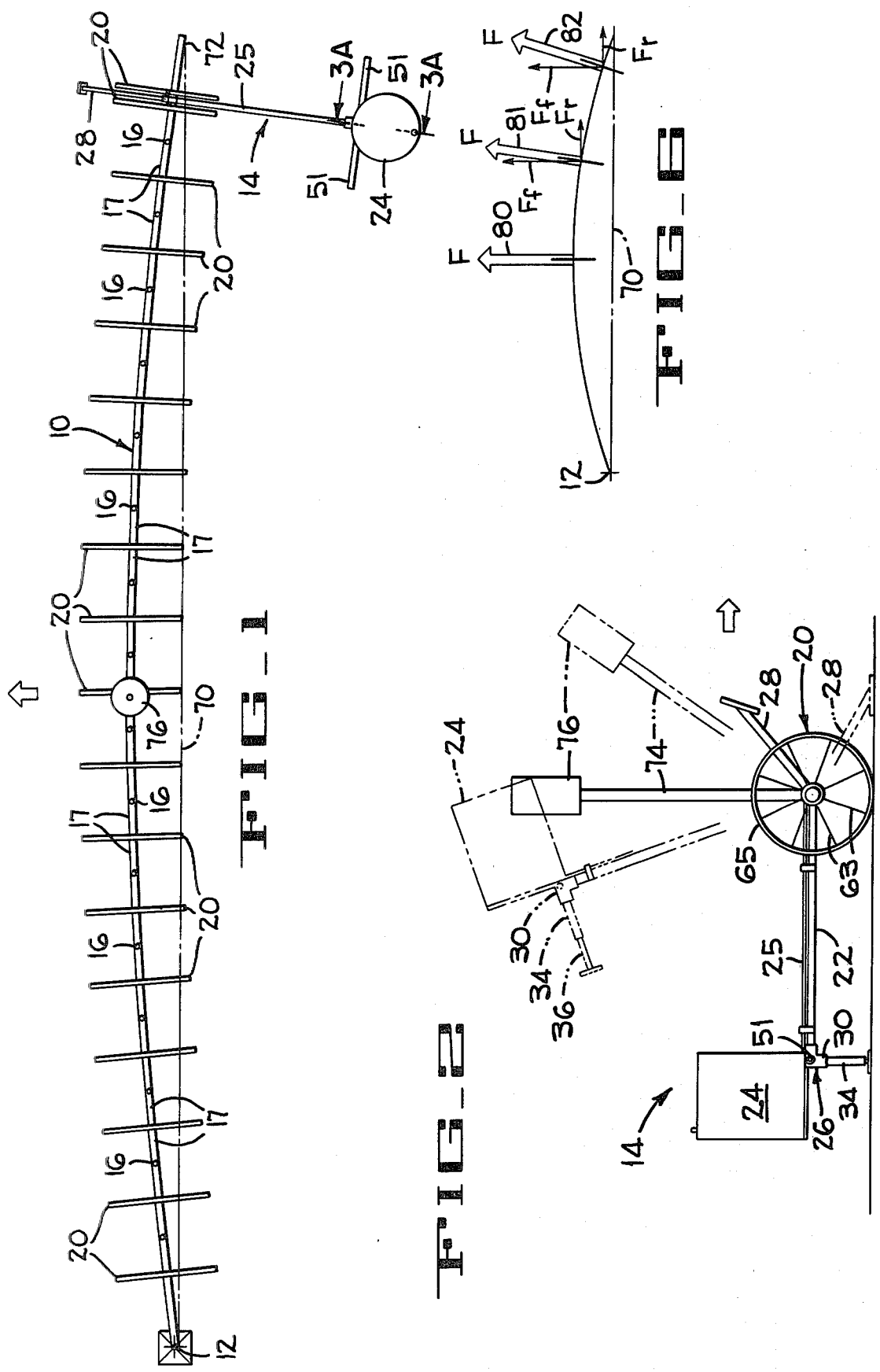

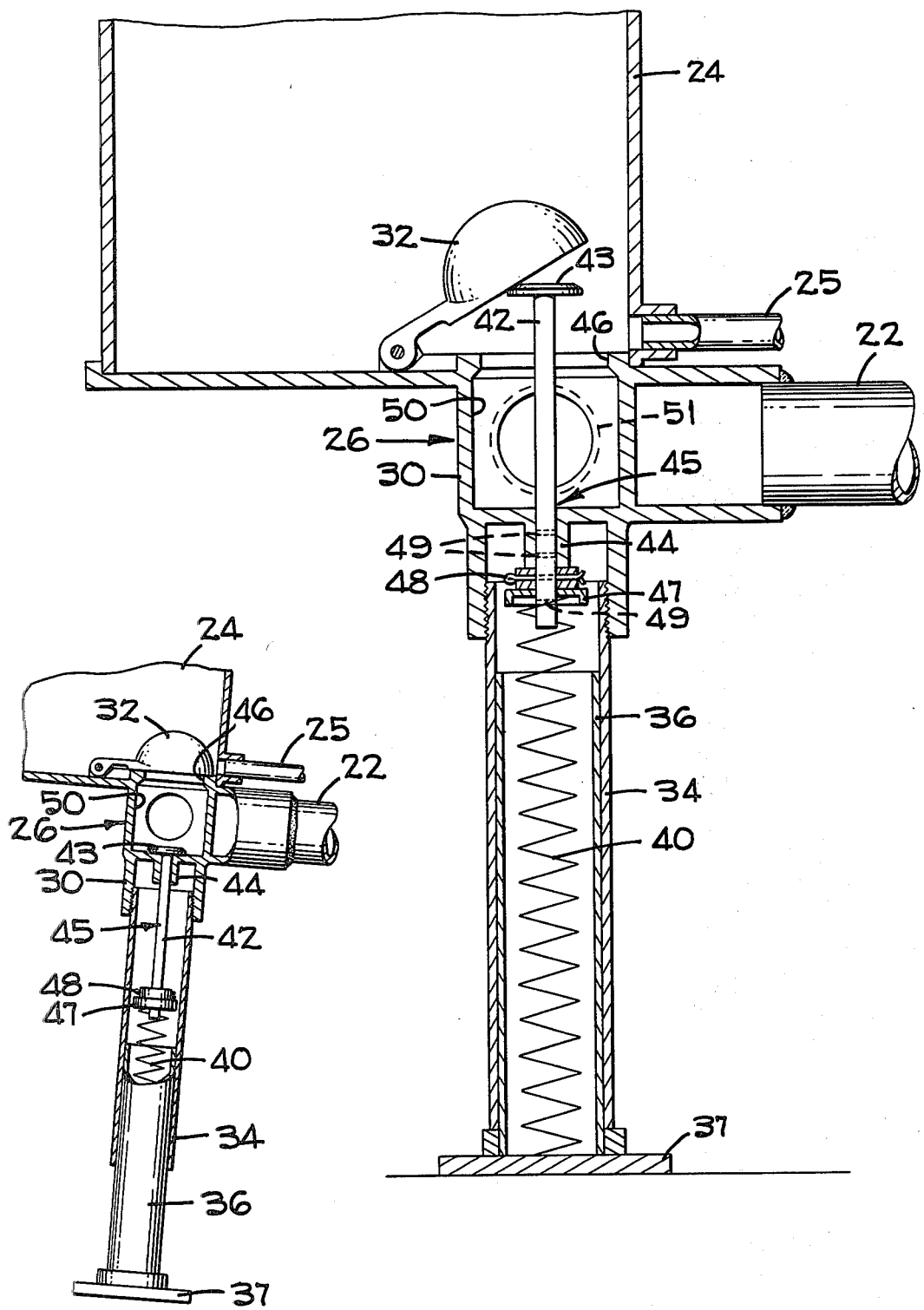

TORQUE DRIVEN ROTARY IRRIGATION SYSTEM

BACKGROUND OF THE INVENTION

1. Field of the Invention

The present invention pertains to movable irrigation systems, and more particularly, it pertains to irrigation systems which are arranged to be connected to a fixed water supply source and which are arranged to be moved in a predetermined path under power supplied by the water pressure therein to irrigate relatively large areas of land.

2. Description of the Prior Art

In those areas which receive little or no rainfall over extended periods of time, such as in the western portion of the United States, it is a common practice to water crops by means of movable irrigation systems. Typically, such irrigation systems comprise a string of interconnected pipe sections having sprinkler heads, or other water spreading means, arranged at spaced intervals along the length thereof and with support wheels being provided for the pipe sections at generally uniformly spaced intervals along the length thereof. The wheels may be arranged to support the pipe sections so that they pass through the axes of the wheels, or the wheels may be mounted on carriages for supporting the pipe sections at an offset position. In either case, the pipe sections and their associated sprinkler heads are supported at a fixed distance above the ground so that they will be above the crop which is to be irrigated. Some means is typically provided to move the string of pipe sections along the area to be sprinkled with the wheels rolling along in predetermined tracks. This movement can either be linear or it can be rotary, i.e., the pipe string can rotate about a central pivot axis where an upstanding water supply pipe is located to which one end of the pipe string is attached.

In the aforementioned rotary movement type of irrigation system, the interconnected string of pipe sections extends radially from the water supply pipe and is driven either by means of the carriages which support the pipe sections at spaced intervals therealong or by means of a single power mover connected to the string of pipe sections at or near the outer end thereof, a typical example of the latter arrangement being shown in U.S. Pat. No. 3,536,261 to Van den Brink. The power for the single power mover means may be provided by an electric battery, a gasoline driven engine, or through an electric power line running along the length of the irrigation tubing and connected to an electric outlet at the inner, fixed end thereof. Alternatively, the power mover may be powered directly through the water pressure in the pipe sections.

The latter drive arrangement, wherein no source of power other than the water supply under pressure is needed, is obviously advantageous. Such a system has been found to be workable as the drive means must be geared to operate at a very low ground speed so that the total area being irrigated will be provided with sufficient water. Typically, the string of interconnected pipe sections makes one complete revolution in the time normally required between waterings (about eight days); hence, the entire length of irrigation tubing need only be continuously driven at a rate so as to make one revolution about the central water supply pipe every eight days.

Hydraulically powered drive means for rotary irrigation systems, which operate under the water pressure in the irrigation tubing, may be located at the single power mover connected at the end of the tubing, or they may be located at each of the support carriages along the length thereof. Such systems may comprise a basic water wheel geared down to move the tubing at a very low rate, or they may comprise cylinder and piston arrangements which drive in only one direction. An example of a water wheel drive means is found in the United States patent to Haynes U.S. Pat. No. 3,590,853 while the United States patent to de Laine et al U.S. Pat. No. 3,730,211 discloses the latter type of apparatus.

SUMMARY OF THE INVENTION

The present invention comprises a self-propelled rotary irrigation system with a drive means of a type unknown in the prior art. An irrigation pipe is connected for rotation about a water source at one end. A means is provided at or near the other end for inducing a torque in said pipe about its axis. The torque so induced serves as an energy source for driving a plurality of individual support assemblies located at spaced intervals along the pipe, said support assemblies having a common axis with said pipe. The support assemblies are adapted to rotate about the common axis in one direction only and the pipe is advanced about the water source by periodic application of the torque at the other end of the pipe.

In the preferred form of the invention, the means for inducing a torque in the irrigation pipe comprises a lever arm mounted at the other end of the irrigation pipe and perpendicularly thereto, a reservoir mounted at the free end of the lever arm and elevated from the ground, and means for alternately filling and draining the reservoir with water so that the reservoir alternately raises and lowers, imparting a cyclic torque to the irrigation pipe. The support assemblies comprise a plurality of wheels, each wheel having a hub at its center which receives the irrigation pipe therethrough and which is adapted to allow said pipe to freely rotate relative to the wheel in one direction only. The hub is disposed so that the irrigation pipe rotates freely during the interval when the water reservoir fills but is grasped by said hub during the interval when water is released from the reservoir. The wheels are thereby driven forward during the interval when water is released from the reservoir and the irrigation pipe is advanced about the water source.

An alternate embodiment of the invention orients the support assemblies in an opposite manner so that the irrigation pipe rotates freely during the interval when water is released from the reservoir and is grasped during the filling of the reservoir. In this embodiment, the wheels are driven forward during the time interval while the reservoir is filled.

BRIEF DESCRIPTION OF THE DRAWINGS

FIG. 1 is a plan view illustrating the irrigation system as a whole.

FIG. 2 is an elevation view of the irrigation system including a phantom outline of the water reservoir in its elevated position.

FIG. 3A is an enlarged vertical section through the reservoir taken along line 3A—3A in FIG. 1.

FIG. 3B is a view similar to that of FIG. 3A, except that the ground shoe is shown in an extended position.

FIG. 6 is a vector diagram illustrating the resolution of forces imparted by the wheels.

DESCRIPTION OF THE PREFERRED EMBODIMENT

Referring now more particularly to the drawings, FIG. 1 is a plan view of a rotary irrigation system constructed in accordance with the present invention. The system will be seen to comprise a length of irrigation pipe 10 having one end connected to a center pivot assembly 12 and the other end connected to a torque drive assembly 14. The center pivot assembly 12 is arranged to be connected to a source of water under pressure and is adapted to direct such water to the connected length of irrigation pipe 10. A plurality of sprinkler heads 16 are spaced along the length of the pipe 10 with each of the sprinkler heads being arranged to disperse water over a generally circular area of increasing radius moving out along the length of the pipe so that a pie-shaped segment of the field is being irrigated at any instant in time. As will be described hereinafter, each of the sprinkler heads 16 is mounted with a rotatable connection to insure the vertical orientation of the head at all times.

Figure 5:
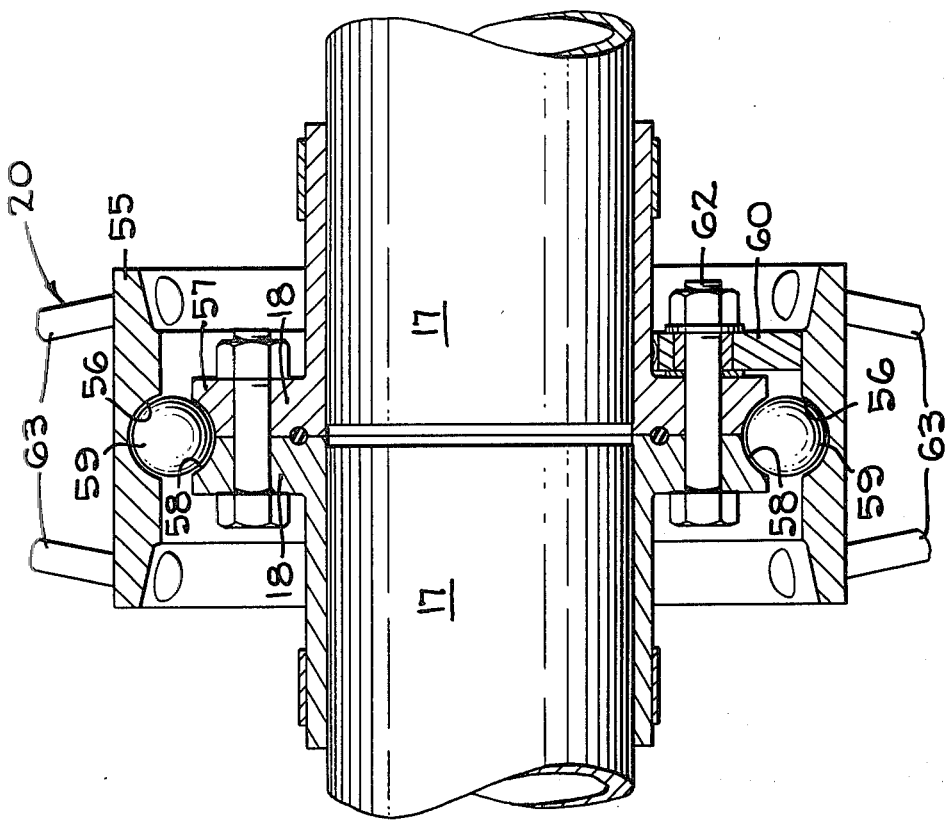
FIG. 5 is a section taken along line 5—5 of FIG. 4.

The irrigation pipe 10 is constructed in a conventional manner wherein it comprises a plurality of innerconnected pipe sections 17 (FIG. 5) which are supported by a plurality of wheel support assemblies 20. The pipe sections 17 have flanges 18 at either end and adjoining pipe sections are rigidly connected to each other as illustrated in FIG. 5. The center pivot assembly 12 is arranged so that, while the irrigation pipe 10 is free to travel about said assembly, the irrigation pipe is not able to freely rotate about its own axis. The irrigation pipe 10 is thus adapted to act as a torsional spring to store the energy used in driving the irrigation system.

The torque drive assembly 14 is best illustrated in FIG. 2. Said assembly comprises a lever arm 22 rigidly connected to the irrigation tubing 10 and extending perpendicularly therefrom, a water reservoir 24 which receives water through an inlet pipe 25, a drain valve assembly 26 which allows the reservoir 24 to fill with water until the lever arm 22 reaches a substantially horizontally position and which thereafter allows the reservoir to drain, and a support arm 28.

The torque drive assembly 14 is adapted to periodically induce a torsional stress in the irrigation pipe 10 which serves as a source of potential energy for driving the wheel support assemblies 20, as described hereinafter. When the reservoir 24 is empty, it is in the position shown in phantom in FIG. 2. The support arm 28 is disposed so that the lever arm 22 is at an angle of approximately 70° from the horizontal. As the reservoir 24 fills, the lever arm 22 is displaced downward and a torque is thereby exerted on the irrigation pipe 10. The torque increases until the lever arm 22 lowers to a substantially horizontal position, as shown in the full line position in FIG. 2, at which time the drain valve 26 is actuated and the reservoir 24 begins to empty.

The drain valve assembly 26 is illustrated in detail in FIGS. 3A and 3B. Said assembly comprises a valve body 30, a float stopper 32 pivotally attached at one end to said valve body 30, a support leg 34 rigidly attached to the lower end of the valve body 30, an extendable sleeve 36 having a ground engaging shoe 37 attached at the lower end thereof, said sleeve adapted to slide within said support leg 34, a spring 40 adapted to urge the extendable sleeve 36 away from the valve body 30, and a push rod 42 having a cap 43 and mounted in a bushing 44 in the valve body, said push rod adapted to reciprocate in the bushing so that the cap engages the underside of the float stopper 32. The spring 40 is attached at the lower end thereof to the ground engaging shoe 37 while the upper end of the spring is attached to the push rod 42. The push rod 42, the spring 40, the shoe 37, and the extendable sleeve 36 together form a valve release assembly 45 which is free to move up and down relative to the valve body 30 and the support leg 34. As shown in FIG. 3A, the assembly 45 is in its retracted configuration with shoe 37 disposed against the ground. As the reservoir 24 raises, the release assembly 45 moves downward, as shown in FIG. 3B.

The operation of the drain valve assembly 26 is similar to that found in a common water closet. When the reservoir 24 is drained and in the elevated position, the float stopper 32 is free to move downward forming a seal with a valve seat 46 on the valve body 30. As the reservoir 24 fills with water through the inlet 25, the weight of the water presses the float stopper 32 more firmly against the valve seat 46 and thereby enhances the seal. As the reservoir 24 fills near capacity, however, the ground shoe 37 engages the ground and urges the release assembly 45 upward. The push rod cap 43 engages the underside of the float stopper 32 but does not break the seal until sufficient force is applied through spring 40 to counteract the water pressure exerted by the water in the reservoir 24. The amount of force applied is determined by the spring constant of spring 40 and is chosen so that the valve will not open until the spring approaches full compression. In this way, the lever arm 22 is allowed to achieve full angular displacement before being released. An adjustable end plate 47 is provided on the push rod 42 so that the height at which the reservoir 24 drains may be varied. This is accomplished by placing a cotter pin 48 in any one of several holes 49 in the lower end of the push rod 42.

Once the float stopper 32 is opened, the water flows into an upper chamber 50 of the valve body 32. A distribution pipe 51 extends outward from either side of the upper chamber 50 and spreads water over the crop as the reservoir 24 drains. The lever arm 22 is rigidly attached to the valve body 30 as shown in FIGS. 3A and 3B. The water reservoir 24 is also rigidly connected to the valve body 30 and the resulting assembly of the tank reservoir 24, the valve body 30 and the lever arm 22 moves in unison as water fills and drains from the reservoir.

Figure 4:
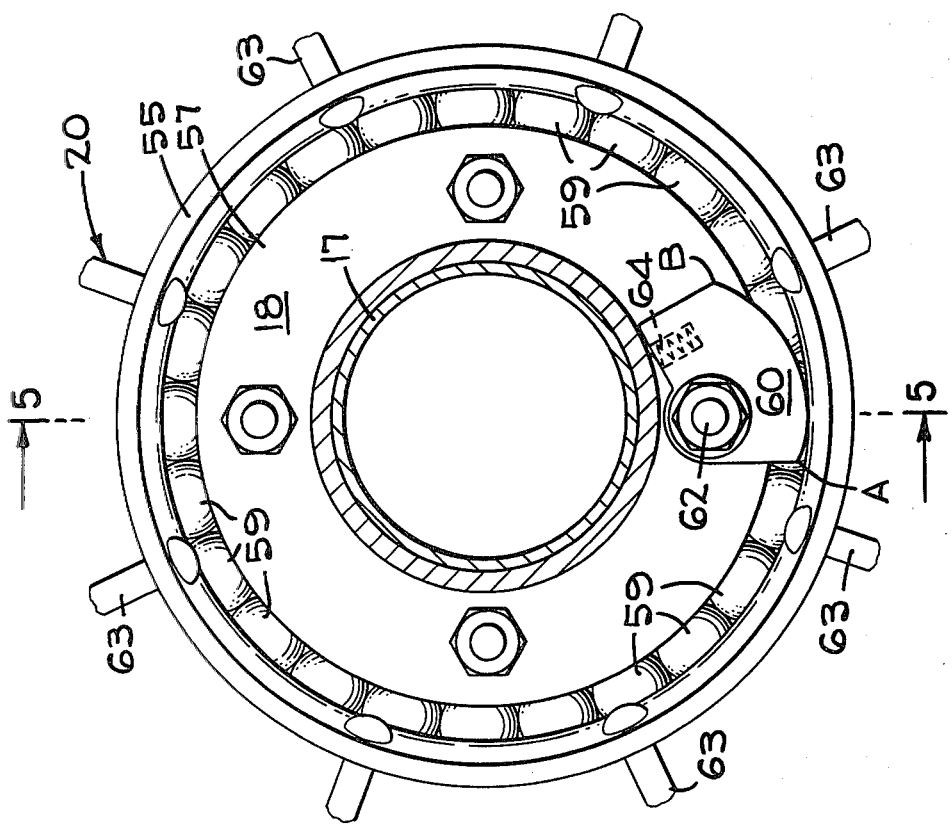
FIG. 4 is a detail view of one of the wheel hubs illustrating the unidirectional clutch mechanism.

The design of the wheel support assemblies 20 allows the potential energy stored in the irrigation pipe 10 to be converted into kinetic energy in the form of forward motion of said irrigation pipe. As illustrated in FIGS. 4 and 5, each wheel support assembly 20 comprises a cylindrical hub 55 having a bearing race 56 formed about the interior surface thereof, an annular ring 57 formed about the irrigation pipe 10 by the flanges 18 on adjacent pipe sections 17, said annular ring having a second bearing race 58 formed therein, and a plurality of plastic balls 59 retained between the first bearing race 56 and the second bearing race 58, said balls adapted to allow the free rotation of the wheel hub 55 relative to the irrigation pipe 10. As described so far, the wheel support assemblies 20 are conventional and typical for irrigation systems of the type wherein the irrigation pipe passes through the axis of the support wheel. The support assembly also includes spokes 63 and a wheel rim 65 attached to the wheel hub 55 as shown in FIG. 2, both of which are also of conventional construction.

For the present invention, it is necessary that the wheel hub 55 rotate freely in only one direction relative to the irrigation pipe 10. Rotation of the wheel hub 55 in the opposite direction relative to the pipe 10 must be prevented. Thus it is necessary to provide some form of latching mechanism which operates in one direction only. Many such systems are available and would work equally well. For example, a clutch similar to a "sprague" automotive clutch would be adequate. A spiral spring attached at one end to the hub and wound around the irrigation pipe would also work since rotation in one direction would constrict the spring around the pipe and prevent rotation. The preferred embodiment of the present invention utilizes a single wedge-type clutch, as illustrated in FIGS. 4 and 5.

The single wedge-type clutch consists of a cam member 60 mounted on a flange bolt 62 and free to rotate thereabout. A spring 64 urges the cam member in a clockwise direction as viewed in FIG. 4. The radius of the cam 60 increases from point A on the contact surface until it reaches a maximum at point B. Thus, as the cam member is rotated in a clockwise direction about its axis, the cam surface is pressed more tightly against the inner surface of the wheel hub 55. As the cam member 60 is rotated in the opposite or counter-clockwise direction about its own axis, however, contact is broken between the cam surface and the hub 55.

As was explained hereinbefore, in the absence of a latching mechanism, the pipe 10 is free to rotate within the wheel hub 55. With the single wedge-type clutch, as illustrated in FIGS. 4 and 5, the pipe 10 is free to rotate in the clockwise direction only, as viewed in FIG. 4. If the pipe 10 is rotated in a counterclockwise direction, the frictional force between the cam surface and the wheel hub 55 will tend to rotate the cam member 60 in a clockwise direction about its own axis. As explained hereinbefore, such clockwise rotation causes the cam surface to engage and rotate the wheel hub 55 in the counterclockwise direction. Rotation of the wheel hub 55, of course, causes the entire wheel to rotate and travel along the ground. In this way, the individual wheel assemblies 20 are driven in a forward direction (indicated by the arrow in FIGS. 1 and 2) to advance the pipe 10 about the center pivot assembly 12.

Bearing in mind the structure of the torque drive assembly 14 and the wheel support assemblies 20, as just described, the operation of the present invention will now be described. A drive cycle begins with the torque drive assembly 14 in the elevated position as shown in phantom FIG. 2. At that time, the reservoir 24 is substantially drained of water and the float stopper 32 is sealed against the valve seat 46 (FIG. 3B). Water constantly enters the tank through inlet line 25 and the reservoir 24 begins to fill. As the weight of the reservoir 24 increases, the downward force on lever arm 22 also increases. The torque on the irrigation pipe 10 becomes greater and the reservoir 24 gradually moves downward. The angular displacement of the lever arm 22 causes the pipe 10, 17 to twist by varying degrees along its length. This rotation is in the counterclockwise direction (as viewed in FIG. 2) and the cam member 60 of each wheel support assembly 20 is oriented so that the pipe 10 rotates freely within each of the wheel hubs 55 and the system as a whole remains in place during the filling of the reservoir 24. Note that as viewed in FIG. 4, the pipe 10 is free to rotate in the clockwise direction since that view is taken in the direction opposite to the view in FIG. 2.

The reservoir 24 fills until the lever arm 22 reaches a substantially horizontal orientation. At that time, the force transmitted by spring 40 becomes sufficient to displace the float stopper 32 upward and allow water to drain from the tank, as described hereinbefore. As the weight in the reservoir decreases, the pipe 10 is allowed gradually to unwind. The rate at which the pipe unwinds depends on the rate at which water runs from the tank. Such discharge rate is controlled using flow restriction orifices (not shown) placed in the discharge lines 51. Rotation of the pipe 10 in the clockwise (as viewed in FIG. 2) direction causes the cam member 60 in each of the wheel support assemblies 20 to grasp against the wheel hub 55, as described hereinbefore. The wheel hubs 55 and wheel rims 65 are thus forced to rotate and advance the irrigation pipe 10 about the center pivot assembly 12.

Note that the present invention compensates for the greater distance that must be traveled by the outer end of the irrigation pipe 10. By twisting the pipe from the outer end, the amount of rotational displacement experienced by the pipe decreases as the location on the pipe approaches the center pivot assembly 12. Thus, the amount the wheel hub 55 is rotated upon the release of tension also decreases as the position of the wheel support assembly 20 is closer to the center. A wheel located half the distance down the irrigation pipe will move forward an amount half that of the wheel located at the far end of the irrigation pipe. Since the full circumference to be travelled by each wheel assembly is a direct function of the distance of that assembly from the center, it will be appreciated that the torque drive system compensates automatically and precisely for the varying distances to be travelled.

The ability of the irrigation system of the present invention, as described hereinbefore, to advance in a straight line about the center pivot assembly 12 is true only when the ground travelled is perfectly level. It will be appreciated that when the ground contour varies, the distance travelled by each wheel also varies and that such small variations can lead to severe misalignment of the irrigation pipe 10. To overcome this, it has been found desirable to maintain an arcuate profile across the advancing irrigation line, as best seen in FIG. 1. The irrigation system advances in the direction of the arrow with the center of the irrigation line somewhat ahead of the center line 70 drawn between the pivot point 12 and the far end of the irrigation line at 72. The result of this arcuate profile is to provide a self-correcting tension on the line which tends to retain the profile.

The two forces on the irrigation line which are in tension will now be explained. First, a lever arm 74 mounted substantially at the middle of the irrigation pipe tends to advance the central portion of the pipe 10 ahead of either end. Referring to FIG. 2, it will be seen that when the torque drive assembly 14 is lowered prior to release of water, the central lever arm 74 is in a vertical position. In this position the arm 74, and an associated weight 76 at the end of the arm, is balanced and provides no torque to the irrigation pipe 10. As the torque drive assembly 14 raises and releases tension on the pipe 10, however, the central lever arm 74 is displaced forward and becomes no longer balanced. The lever arm imparts an additional clockwise torque at the center of the irrigation pipe 10 which, as explained hereinbefore, tends to rotate the wheels forward. As this additional torque is experienced primarily near the middle of the pipe 10, the wheels near the middle turn more than they otherwise would have. Thus, the wheels near the middle of the pipe tend to advance at a greater angular velocity about the central pivot point than the wheels at either end. If this were the only force at work, the irrigation pipe would quickly become misaligned with the outer end trailing badly and falling in toward the center. However, a second force balances the first and acts to maintain the arcuate profile as shown in FIG. 1.

The second force lies in the outward radial direction and is provided by each of the wheels along the outer half of the irrigation pipe 10. Note that as long as the pipe 10 lies along the center line 70, the direction of each wheel is precisely in the direction of advance of the irrigation pipe. As soon as the center of the tubing advances ahead of the center line, however, the directions of the wheels diverge with the outer wheels pointing away from the center pivot point 12. The force provided by the forward rotation of each of the wheels no longer acts solely to advance the irrigation pipe 10 and a radial force is introduced.

This radial force is illustrated by the vector diagrams of FIG. 6. Arrow 80 represents the force F provided by a wheel disposed perpendicularly to the center line of the irrigation system. This force resolves into a single component in the direction of travel, i.e., normal to the center line. However, as soon as the wheel is directed away from the center of the irrigation system, as represented by arrows 81 and 82, the force resolves into two components, i.e., a forward component $F_f$ and a radial component $F_r$ directed away from the center pivot assembly 12. Furthermore, the greater the divergence of the wheel from the forward direction, the greater becomes the radial force imparted on the irrigation pipe 10. The aggregate of the radial forces provided by each of the wheel assemblies tends to straighten the irrigation pipe 10 in opposition to the first force which tends to advance the central portion.

Note that as the advance of the central portion increases, the outer wheels are directed further away from the central pivot. This in turn causes a greater radial force to counteract the advance of the central section of the pipe. Thus, a tension is maintained between the forces resulting in the convex arcuate profile of the irrigation pipe 10, as seen in FIG. 1.

Since the irrigation pipe 10 rotates back and forth during each drive cycle, each sprinkler head 16 must be rotatably mounted in order to maintain a substantially vertical orientation during operation of the system. Such rotatable connections are well known in the prior art and manufactured by companies including Pierce Irrigation Corporation, Eugene, Oregon and Wade Manufacturing Company, Portland, Oregon. The structure of such rotatable mountings will be briefly described.

At each sprinkler head 16 location on the pipe 10, a pipe riser extends upward a distance of approximately one foot. The sprinkler head 16 is rotatably mounted at the upper end of the riser. A plumb weight extends downward from the sprinkler head 16, acting to maintain the sprinkler head in a vertical orientation at all times.

It will be appreciated that the present invention may be easily modified so that the advance of the pipe 10 about the center pivot assembly 12 will occur during the interval while the reservoir 24 is filling rather than during the interval while the reservoir is draining. This is accomplished simply by reversing the cam member 60 on each of the wheel support assemblies 20 so that the hub 55 is free to rotate in the clockwise direction rather than the counterclockwise direction, as viewed in FIGS. 2, 4 and 5. With this configuration, the irrigation pipe will rotate freely inside each of the hubs 55 while the reservoir 24 is draining and will drive the hubs 55 while the reservoir is filling.

In either configuration, the timing of the irrigation system is controlled by varying the rate at which the reservoir 24 is filled and the rate at which the reservoir is drained. This is accomplished by placing a flow restriction orifice (not shown) in the inlet line 25 or in the distribution pipe 51.

Although the best mode contemplated for carrying out the present invention has been herein shown and described, it will be apparent that modification and variation may be made without departing from what is regarded to be the subject matter of the invention.

What is claimed is:

1. A self-propelled rotary irrigation system for connection at one end to a source of water located at the center of an area to be irrigated, said system comprising:
    a length of pipe for carrying water, said pipe having a longitudinal axis;
    a plurality of irrigation outlets arranged in a spaced relationship along said length of pipe for discharging water therefrom;
    means for mounting said pipe with said longitudinal axis of said pipe in a generally horizontal plane;
    means for connecting a first end of said pipe to a water source in a manner such that the length of pipe is free to travel about said source and such that said first end is unable to rotate about the longitudinal axis of said pipe;
    means for inducing a rotational torque about said longitudinal axis to said length of pipe at an opposite end from said first end whereby the degree of rotational displacement varies along the length of pipe; and
    wheel means for supporting and advancing the pipe located at spaced intervals along the length thereof, said wheel means being responsive to the torque induced in the pipe to advance the pipe about the water source.

2. A self-propelled rotary irrigation system as described in claim 1, wherein the length of pipe has an arcuate profile in a plan view of said system with an intermediate portion of said length of pipe advancing ahead of both said ends.

3. A self-propelled rotary irrigation system as described in claim 2, wherein the arcuate profile of the length of pipe is maintained by providing means causing the wheel means for supporting and advancing the pipe located along the intermediate portion of said length of pipe to advance ahead of the wheel means for supporting and advancing located at either end.

4. A self-propelled rotary irrigation system as described in claim 1, wherein the means for inducing a rotational torque uses energy derived from the flow of water through the length of pipe.

5. A self-propelled rotary irrigation system, said system comprising:

a length of pipe for carrying water; said length of pipe having a longitudinal axis; a plurality of irrigation outlets arranged in a spaced relationship along said length of pipe for discharging water therefrom;

means for mounting said pipe with said longitudinal axis of said pipe in a generally horizontal plane;

means for connecting a first end of the length of pipe to a fixed water source located at the center of the area to be irrigated in a manner such that said pipe is free to travel about said source and such that said first end is unable to rotate in a vertical plane about the axis thereof;

a lever arm rigidly connected to the other end of the length of pipe and perpendicular thereto;

a reservoir mounted adjacent the other end of the lever arm in a manner such that the weight of said reservoir tends to rotate the lever arm whereby a torque is induced in the length of pipe;

a plurality of wheels each having a central axis, said wheels being located at spaced intervals along the length of pipe;

a hub located at the central axis of each wheel and adapted to receive the length of pipe therethrough, each of said hubs having means to freely rotate relative to said length of pipe in one direction and to grasp the length of pipe when relative rotation is in the opposite direction; and means for periodically filling and draining the reservoir with water whereby a cyclic torque is induced in the length of pipe and whereby a rotation is induced in each of the wheels to advance the pipe about the water source.

6. A self-propelled rotary irrigation system as in claim 5, wherein the means for periodically filling and draining the reservoir with water includes a float valve, means for closing said valve when said reservoir is in a generally vertical position, and means for opening said valve when said reservoir is in a generally horizontal position.

7. A self-propelled rotary irrigation system as in claim 5, further comprising a second lever arm having a first end attached generally at the center portion of the length of pipe and having a weight at the other end thereof, said lever arm extending radially outward from the axis of said pipe, said lever arm adapted to provide an additional torque to the center portion of the length of pipe in response to the torque provided by the reservoir whereby the wheels located along the center portion of the length of pipe are advanced at a greater angular rate than the wheels near either end in order to maintain an arcuate profile along the length of pipe.

8. A self-propelled irrigation system as in claim 7, wherein the second lever arm lies substantially vertically when the reservoir is full and moves about said pipe longitudinal axis toward a horizontal position as the reservoir drains, said movement causing an additional torque to be imparted to the center portion of the length of pipe.

* * * * *